(12) United States Patent
Zimmermann et al.

(10) Patent No.: US 8,667,786 B2
(45) Date of Patent: Mar. 11, 2014

(54) CONVERTER AND METHOD FOR CONVERTING MECHANICAL ENERGY INTO ELECTRICAL ENERGY

(75) Inventors: Stefan Zimmermann, Karlstadt (DE); Christian Langenstein, Laufach (DE); Nik Scharmann, Wuerzburg (DE); Louis Verdegem, Longthorpe (GB)

(73) Assignee: Robert Bosch GmbH, Stuttgart (DE)

( * ) Notice: Subject to any disclaimer, the term of this patent is extended or adjusted under 35 U.S.C. 154(b) by 883 days.

(21) Appl. No.: 12/666,867

(22) PCT Filed: Jun. 20, 2008

(86) PCT No.: PCT/EP2008/004988
§ 371 (c)(1),
(2), (4) Date: Apr. 26, 2010

(87) PCT Pub. No.: WO2009/003598
PCT Pub. Date: Jan. 8, 2009

(65) Prior Publication Data
US 2010/0207390 A1    Aug. 19, 2010

(30) Foreign Application Priority Data

Jul. 2, 2007 (DE) .......................... 10 2007 030 663
Aug. 27, 2007 (DE) .......................... 10 2007 040 338
Nov. 23, 2007 (DE) .......................... 10 2007 056 400

(51) Int. Cl.
*F03B 13/18* (2006.01)
*F15B 7/00* (2006.01)

(52) U.S. Cl.
USPC ................................................ 60/398; 60/452

(58) Field of Classification Search
USPC ..................................................... 60/398, 452
See application file for complete search history.

(56) References Cited

U.S. PATENT DOCUMENTS

| | | | |
|---|---|---|---|
| 4,531,063 A * | 7/1985 | Vielmo et al. | 60/398 |
| 4,594,853 A * | 6/1986 | Raichlen et al. | 60/398 |
| 6,300,698 B1 | 10/2001 | Fargo et al. | |
| 6,812,588 B1 | 11/2004 | Zadig | |
| 2002/0047273 A1 | 4/2002 | Burns et al. | |
| 2009/0101216 A1 | 4/2009 | Donders | |

FOREIGN PATENT DOCUMENTS

| | | |
|---|---|---|
| DE | 10 2005 051 324 | 2/2007 |
| DE | 10 2007 018 600 | 10/2008 |
| NL | 1002765 | 7/1996 |
| WO | 85/04219 | 9/1985 |
| WO | 97/37123 | 10/1997 |
| WO | 2005/069824 | 8/2005 |

* cited by examiner

*Primary Examiner* — F. Daniel Lopez
(74) *Attorney, Agent, or Firm* — Michael J. Striker

(57) ABSTRACT

The present invention relates to a converter comprising a pump which is driven directly or indirectly by a natural force such as a water swell, it being possible for a hydraulic machine to be driven by the pump. The hydraulic machine is force-coupled to an electrical machine which may function as a generator or a motor. According to the present invention, the force acting on the pump is regulated via a control loop as a function of oscillation parameters of the natural force.

27 Claims, 8 Drawing Sheets

CONVERTER AND METHOD FOR CONVERTING MECHANICAL ENERGY INTO ELECTRICAL ENERGY

The present invention relates to a hydraulic/electrical converter according to the preamble of claim 1, and to a method for converting mechanical energy into electrical energy using a converter according to the preamble of independent claim 21.

Hydraulic/electrical converters are used, e.g., in wave generators of the type described in U.S. Pat. No. 6,300,698 B1. The known wave generator includes a hydraulic cylinder which is operatively connected to a buoy, thereby enabling the hydraulic cylinder to be actuated via the water swell and the associated motion of the buoy, and to pump pressure medium into a hydraulic circuit. A hydraulic rectifier is assigned to the hydraulic cylinder, thereby enabling pressure medium to be pumped into the hydraulic circuit independently of the direction of motion of the hydraulic cylinder, in order to charge a hydraulic accumulator connected downstream of the hydraulic rectifier and drive a fixed motor. The output shaft of the fixed motor is connected to a generator, thereby enabling the hydraulic energy in the above-described hydraulic circuit to be converted into electrical energy. Since the water swell varies greatly in terms of amplitude and frequency, a complex electronic circuit must be provided in order to even out the generator output voltage.

In the subsequently published application 10 2007 018 600 belonging to the applicant, a converter comprising a pump driven by a water swell is disclosed, the pump being used to charge a hydraulic accumulator and drive a hydraulic motor which, in turn, drives a generator. In this solution, the hydraulic motor is connected to a pressure network and is designed to be speed controlled, thereby enabling the generator to be driven largely at a specified rotational speed by adjusting the swivel angle of the hydraulic motor as a function of the hydraulic-side pressure fluctuations. Systems of this type that include a speed controlled variable motor that is operated in a pressure network are also referred to as secondary control, in which the rotational speed of the variable motor is regulated such that it is attained independently of the particular load pressure of the pressure present in the pressure network. This pressure is substantially dependent on the load state of the hydraulic accumulator. The intake capacity of the hydraulic motor must be changed until the motor torque has reached equilibrium with the load and, simultaneously, the setpoint rotational speed has been reached.

Due to this type of speed control, the converter must be extremely complex in terms of design and control.

In contrast, the object of the present invention is to create a converter and a method via which an oscillating natural force such as a water swell may be utilized using a simple device in order to provide electrical energy.

This object is attained with regard for the converter via the combination of features of claim 1, and with regard for the method via the features of independent claim 21.

According to the present invention, the converter includes a pump which is driven by an oscillating natural force such as a water swell, via which a hydraulic machine system including at least one hydraulic machine may be driven, the hydraulic machine system being coupled to an electrical machine to convert mechanical energy into electrical energy. The converter includes a control loop via which the adjustable hydraulic machine may be adjusted such that the piston pump is acted upon using a predetermined force or a predetermined pressure differential. This pressure or force control is implemented such that optimal conversion of the energy supplied by the natural force (water swell) into hydraulic energy is ensured at the controlled level of force or pressure. Accordingly, the controlled level of pressure or force may be changed as a function of the oscillation parameters of the natural force (water swell). The present invention is therefore unique relative to the concepts described initially, in which the generator speed was regulated in a relatively complex manner, and is practically designed such that the pump, e.g., the force-stroke curve of a piston pump, is adjusted as a function of the oscillation parameters such that mechanical energy is converted to hydraulic energy in an optimal manner. Pressure/force control of this type may be realized in an extremely simple manner.

In a preferred embodiment of the present invention, the pump is designed as a piston pump, preferably as a double rod cylinder or a plunger pump, the pressure chambers of which are each connected via a pressure line to ports of the hydraulic machine.

To prevent cavitations from forming in the expanding pressure chamber when the piston moves very rapidly, a hydraulic accumulator may be installed in each of the pressure lines.

In one embodiment, the hydraulic machine system includes two small hydraulic machines. Given the same displacement, small hydraulic machines of this type have the advantage that they operate more efficiently than a hydraulic machine having relatively large displacement. In this variant, maximum displacement is attained by activating both hydraulic machines simultaneously.

According to the present invention, the two hydraulic machines may be controlled synchronously or separately. In the latter alternative mentioned above, the second hydraulic machine may be torque controlled, while the first hydraulic machine mentioned above is force or pressure controlled, as mentioned initially.

In one variant of the present invention, the second hydraulic machine is not activated until the flow of pressure medium may no longer be supplied via the first hydraulic machine mentioned; it is then adjusted to maximum intake or displacement.

According to a variant of the present invention, a pressure accumulator may be assigned to the second hydraulic machine on the high-pressure side. Since the high-pressure side and the low-pressure side of the converters change constantly due to the wave motion, a hydraulic rectifier must be assigned to this pressure accumulator.

To compensate for losses due to leakage, prevent cavitations from forming in the low-pressure branch, and to replace the pressure medium in the pressure medium circuit, the converter may be connected to a supply/flush unit, via which the pressure lines connected to the pump mentioned initially may be connected to the tank or a supply pump in order to replenish pressure medium or to allow it to flow out to the tank, thereby preventing the pressure medium from overheating, for example.

As a hydraulic safeguard for the converter, pressure relief valves that open in opposite directions may be installed between the two pressure lines; when a maximum pressure is exceeded in a pressure line, the pressure relief valves open a pressure medium connection to the other pressure line.

A coupling, which is designed such that torque fluctuations are cushioned and/or damped, is preferably installed in a connection train between the hydraulic machine and the electrical machine.

Preferably, the hydraulic machine may be operated in four-quadrant mode, thereby making it possible to eliminate a hydraulic or electrical rectifier. In a hydraulic machine of this type, the swivel angle may be moved through 0 in the region of the dead centers of the piston pump, thereby retaining the direction of rotation of the hydraulic machine when the piston moves in the opposite direction.

In the solution according to the present invention, it is preferable for the electrical machine to rotate at a specifiable, approximately constant speed. This rotational speed is specified, e.g., by the frequency of the power supply to which the electrical machine is connected.

The converter is preferably used in a wave generator in which the water swell acts on a floating body, via which the piston pump is driven in accordance with the reciprocating motion of the floating body.

In a concept according to the present invention, the force is controlled such that the natural weight of the wave generator, in particular the natural weight of the floating body, that acts in the lowering direction may be compensated for.

Pressure sensors for measuring the pressure in the particular pressure chambers may regulate the pressure in the pressure chambers of the piston pump.

A centrifugal mass may be installed in the connection train between the hydraulic machine and the electrical machine in order to compensate for torque fluctuations. In this case, it is preferable to design the electrical machine as an asynchronous machine.

To increase the operational reliability of the converter, the control may be designed such that, given very large amplitudes of the oscillating natural force, e.g., very tall waves, the piston of the piston pump is braked before it reaches dead center by increasing the force acting on it, thereby preventing the piston pump from bouncing.

The force acting on the piston pump is controlled mainly by adjusting the swivel angle of the hydraulic motor.

In a control concept according to the present invention, an output signal from a force or pressure controller, and a pilot signal—which is generated, e.g., as a function of the velocity of a mass moved by the water swell, or as a function of a piston speed of the pump—are input into the control signal in order to control the hydraulic machine, i.e., in the case of an axial piston pump, the control signal for adjusting the swivel angle, thereby enabling the hydraulic machine to be adjusted in advance as a function of this pilot value, and then the system is preloaded via the output signal of the pressure controller according to the desired force control or another controlled variable.

The resultant control signal may then be adapted to the conditions in a suitable manner using non-linear adaptation, and then supplied to an actuator in order to adjust the swivel angle or the like.

Other advantageous developments of the present invention are the subject matter of further dependent claims.

Preferred embodiments are explained below in greater detail with reference to the schematic drawings.

Figure 1:
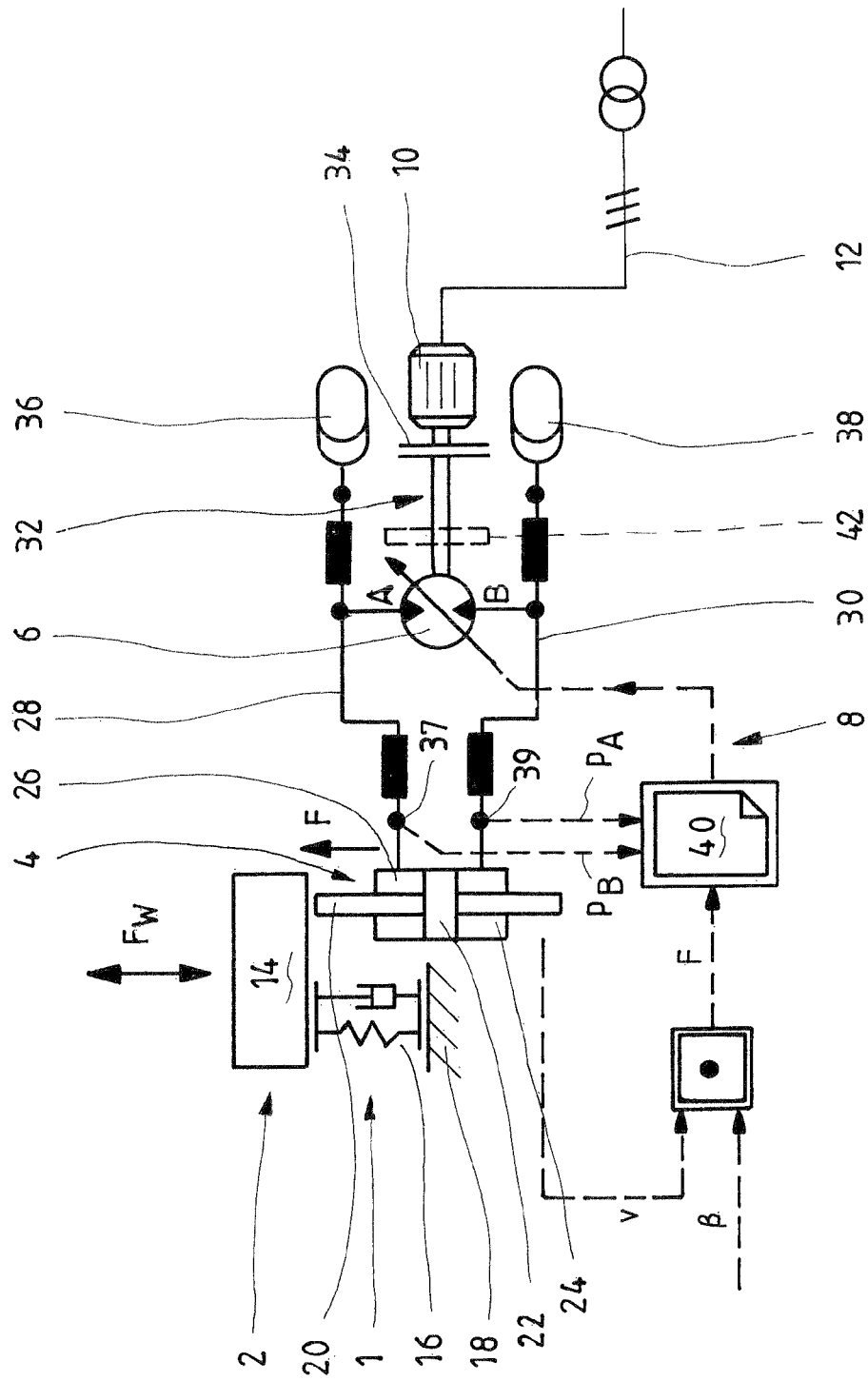
FIG. 1 shows a schematic diagram of a hydraulic/electrical converter (wave generator) according to the present invention.

In the embodiment described below, the hydraulic/electrical converter is designed as a wave generator 1, via which the energy stored in the water swell is convertible into hydraulic energy and then into electrical energy. Wave generator 1 is mainly composed of a floating body 2, the oscillating motion of which—which is caused by the water swell—is transferred to a piston pump which is designed as a double rod cylinder (plunger pump) 4 in the embodiment shown. It is connected via a closed hydraulic circuit to a hydraulic machine 6, the swivel angle of which may be adjusted in order to change the displacement/intake capacity. Hydraulic machine 6 may be designed, e.g., as an axial piston pump. The swivel angle of hydraulic machine 6 is adjusted using a control loop 8, via which the force acting on double rod cylinder 4 is adjusted. Hydraulic machine 6 is force-coupled to an electrical machine which is referred to hereinbelow as generator 10. It is typically driven by hydraulic machine 6, thereby making it possible to store the generated electrical energy in a network labeled using reference numeral 12 in FIG. 1.

A construction of the type developed by the company Archimedes Wave Swing, Ltd. may be used as floating body 2, for example. A floating body 2 of this type is anchored to ocean floor 18 and is located entirely under water; an oscillating weight 14 is acted upon via the water swell by a force $F_W$ which oscillates in an irregular manner in terms of amplitude and frequency according to the wave swell. An irregular course of force of this type, which is typical for the particular wave climate, is shown in the diagram presented in FIG. 2. Courses of force over time of this type may be calculated in an approximate or idealized manner using suitable model calculations for practically any wave climate. The FT profiles are then stored in a data memory, and they are taken into account in the closed-loop control described below.

The schematic illustration in FIG. 1 also shows that the up and down motion of floating body 14 is followed by a spring/damping system 16, thereby enabling high-frequency fluctuations or excessive accelerations to be suppressed or reduced. Regarding further details on the design of floating bodies 2 of this type, reference is made to the Web site of the company AWS Ocean Energy (www.awsocean.com), and so no further descriptions are necessary.

Oscillating weight 14 of floating body 2 acts on a piston rod 20 of a piston 22 of double rod cylinder 4 which therefore follows the vertical motion of oscillating weight 14. Piston 22 subdivides double rod cylinder 4 into two annular chambers 24, 26 which are connected via pressure lines 28 and 30 to ports A and B of hydraulic machine 6. Hydraulic machine 6 may operate in four-quadrant mode, and so the direction of rotation and the torque direction are reversible. Therefore, hydraulic machine 6 may be operated as a hydraulic pump and as a hydraulic machine having an alternating direction of rotation. A coupling 34 is installed in a connection train 32 between hydraulic machine 6 and electrical machine 10, thereby making it possible to separate the force coupling if a disturbance occurs in network 12 or in the region of the converter. Coupling 34 is typically designed to have a spring-action or damping effect, thereby making it possible to even out abrupt fluctuations in torque.

As mentioned above, the hydraulic circuit, which includes double rod cylinder 4 and hydraulic machine 6, is designed as a closed circuit. To prevent cavitations from occurring, hydraulic accumulators 36, 38 are installed in pressure lines 28, 30; hydraulic accumulators 36, 38 are loaded via double rod cylinder 4 and allow additional hydraulic fluid to flow if one of the annular chambers 24, 26 expands very rapidly.

Figure 2:
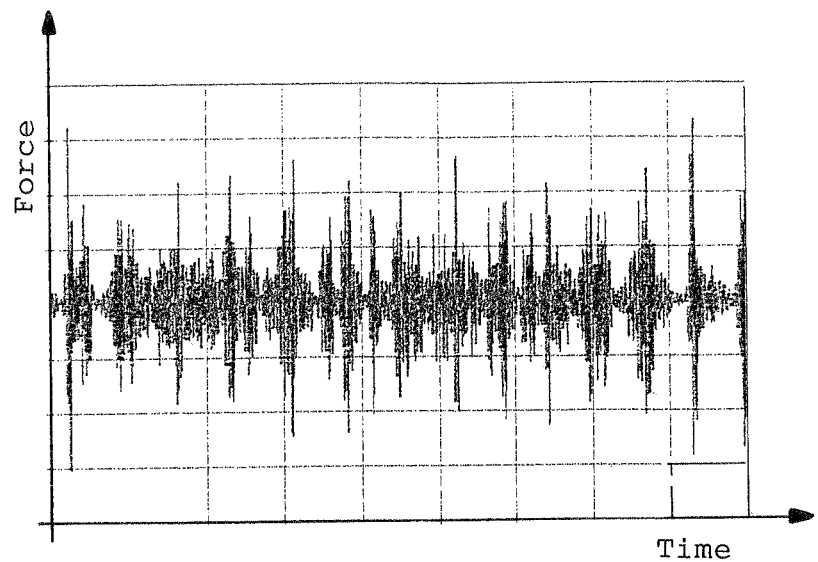
FIG. 2 shows a diagram in which the force generated by a water swell is plotted as a function of time.

Piston 22 of double rod cylinder 4 is acted upon by a force F via closed loop 8 as a function of the wave climate (see FIG. 2). The graph of force F is as irregular as the graph of force $F_W$ depicted in FIG. 2. Force $F_W$ is calculated as a function of the wave climate, i.e., as a function of the stored F-t graph, and is then processed as a setpoint quantity in control loop 8. As shown in FIG. 1, setpoint quantity F may also be calculated based velocity v of piston 22, which is determined using a suitable recording device, and a damping parameter beta, as follows: F=v×beta. In this case, beta is also stored as a function of the wave climate (FIG. 2) in a data memory of an electronic control unit, which is not depicted in FIG. 1, of converter 1. The result of the aforementioned calculation is setpoint force F.

In the embodiment shown, the pressure present in annular chambers 24, 26 is detected using pressure sensor 37, 39, and related pressures $p_A$ and $p_B$ are supplied as actual quantities to a force controller 40 which is designed, e.g., as a proportional action controller. Actual force $F_{IST}$ is calculated in force controller 40 based on the pressures that were measured, and on the effective areas of piston 22, and it is compared to setpoint force F; if a deviation exists, an output signal is output to variable displacement pump 6, thereby adjusting its swivel angle alpha. Swivel angle alpha is adjusted until the force acting on piston 22 is equal to setpoint force F. This force is selected depending on the wave climate such that kinetic wave energy is converted into hydraulic energy in an optimal manner, thereby optimizing the efficiency of the system using a relatively simple device.

Figure 3:
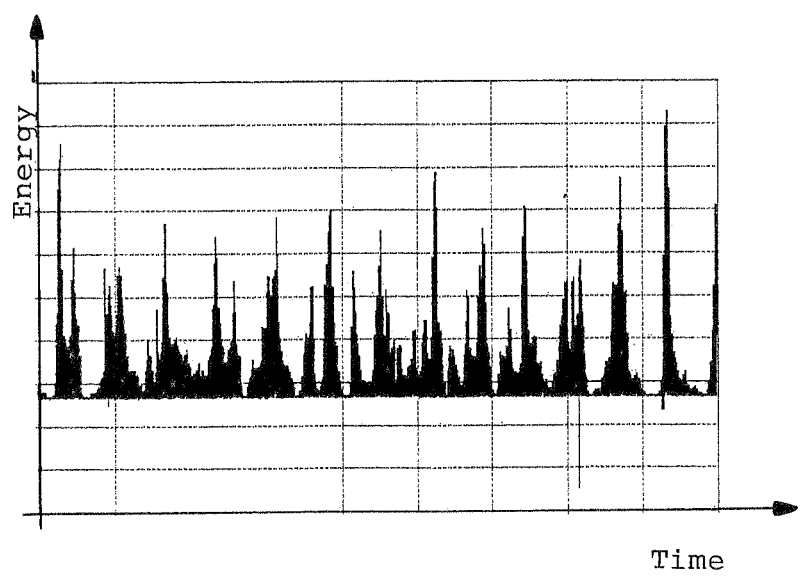
FIG. 3 shows the energy that is measurable at the output shaft of a hydraulic machine of the converter as a function of time.

When one of the two dead centers of piston 22 is reached, swivel angle alpha of variable displacement pump 6 is moved through 0 using force controller 40, and so the direction of rotation of variable displacement pump 6 remains unchanged when direction of motion of piston 22 reverses. By moving variable displacement pump 6 through the neutral position in this manner, it is possible to eliminate a hydraulic or electronic rectifier as used in the prior art described initially, thereby further simplifying the design. The energy that results in connection train 32 using this type of control is depicted in FIG. 3. This energy, which is output at generator in order to generate current, therefore fluctuates, as does the wave climate, although it is rectified; the integrated mechanical energy, which is converted via the generator into electrical energy, is high compared to conventional solutions, due to the optimized force control of double rod cylinder 4.

A centrifugal mass 42, which is indicated using a dashed line, may be installed in connection train in order to smooth out torque fluctuations in connection train 32. In this case, electrical machine 10 should be designed as an asynchronous machine since an asynchronous machine of this type permits slippage to occur as a result of the angular momentum of centrifugal mass 42.

Basically, synchronous machines may also be used, in which case the reactive power is drawn from connected mains 12, and the electrical energy generated via the wave generator is supplied as electrical active power to network 12. In the embodiment described, the rotational speed of generator 10 should be specified via the frequency of network 12, and so the generator rotates, e.g., at a rate of approximately 1700 revolutions per minute in the case of a 50 Hz network. Regulation of rotational speed in the sense of the solutions described initially is not required.

If a wave swell is very small, and the flow of pressure medium being pumped through the closed hydraulic circuit is therefore low, it would be possible for hydraulic motor 6 to brake electrical machine 10. In this case, however, electrical machine 10 functions as a motor, and hydraulic machine 6 functions as a pump, and so pressure medium is pumped into one of the annular chambers 24, 26 in accordance with adjusted swivel angle alpha, in order to displace/accelerate piston 22 in a corresponding direction. That is, depending on the wave climate, hydraulic machine 6 and electrical machine 10 may function as motor/generator or as pump/motor.

Figure 4:
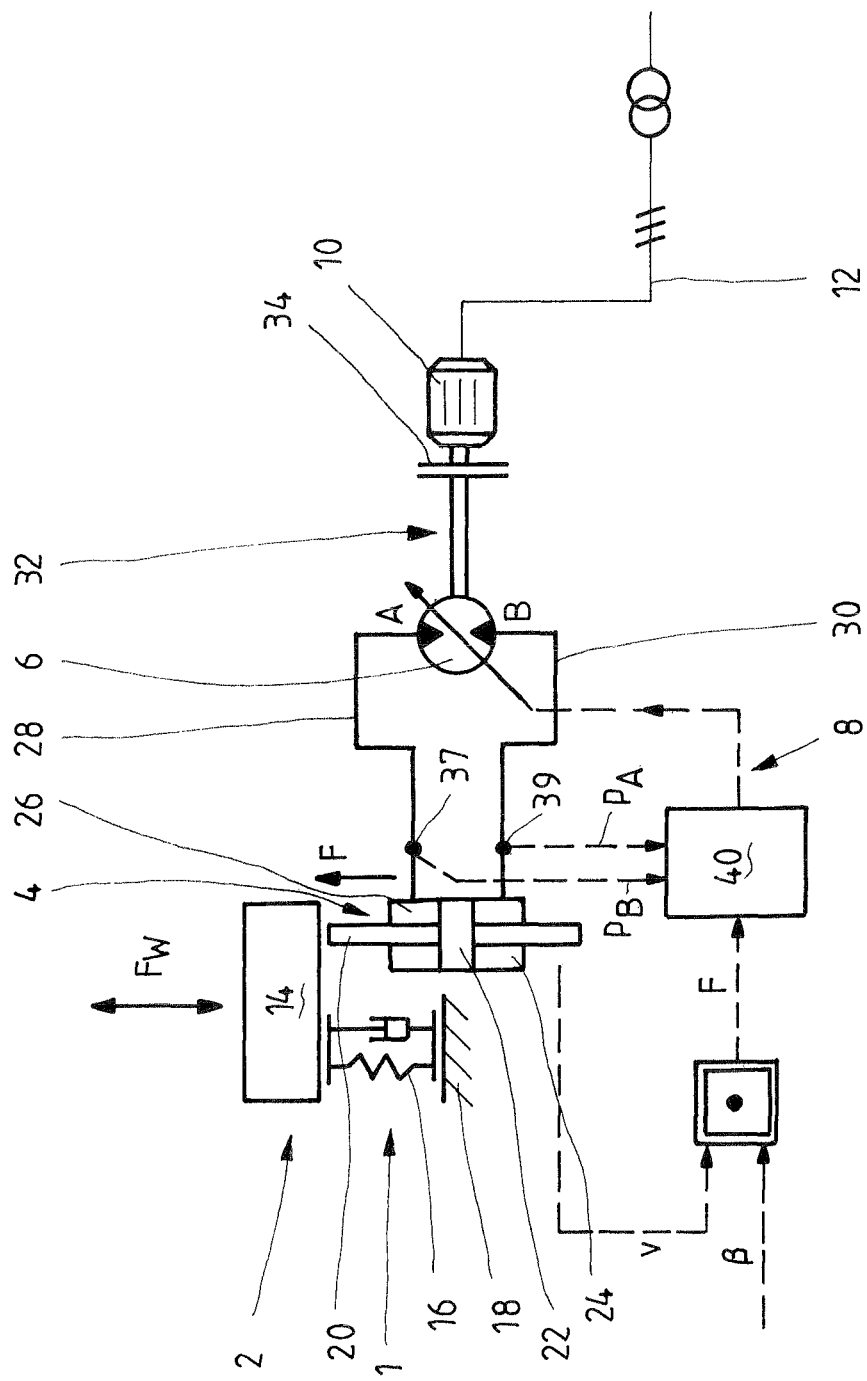
FIG. 4 shows a variant of the converter depicted in FIG. 1.

FIG. 4 shows a variant that is simplified compared to converter 1 depicted in FIG. 1, in which the two hydraulic accumulators 36, 38 in pressure lines 28, 30, and centrifugal mass 42 have been eliminated. It has been shown, surprisingly, that a converter of this type is easier to control since it has a more stable control behavior. Otherwise, the embodiment depicted in FIG. 4 corresponds to that depicted in FIG. 1, and so no further explanations are necessary.

Figure 5:
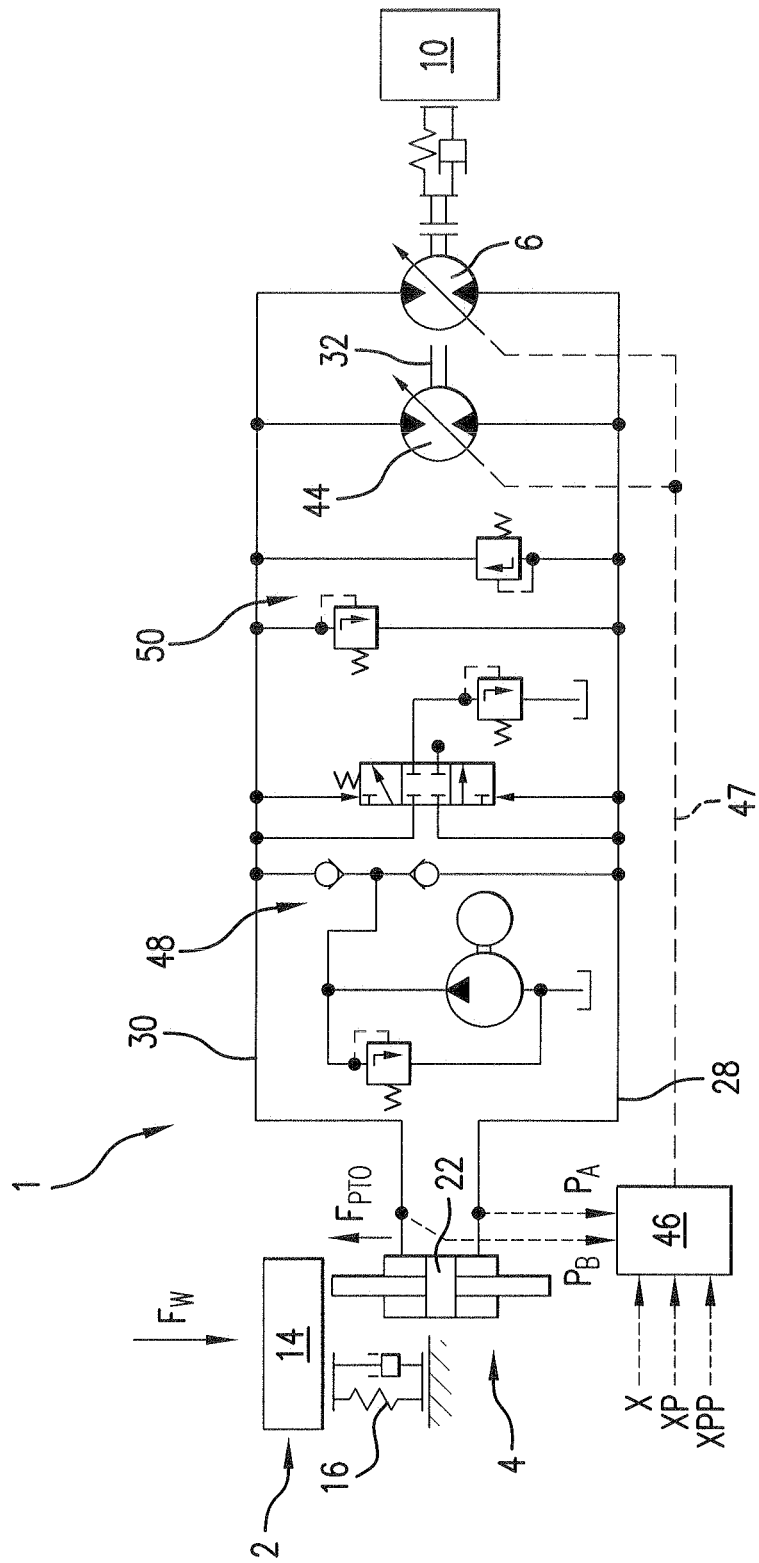
FIG. 5 shows an embodiment of a converter which includes two synchronously controlled hydraulic machines.

FIG. 5 shows a variant of the converter according to FIGS. 1 and 4, in which two smaller hydraulic machines 6, 44 are used instead of a single relatively large hydraulic machine. Smaller hydraulic machines 6, 44 are likewise designed as axial piston units that may be moved through the neutral position, e.g., model A4V marketed by the applicant.

In turn, these two small hydraulic machines 6, 44 are controlled via a controller 46 designed as a force controller. Hydraulic machines 6, 44 are both operatively connected to connection train 32, and so generator 10 is driven simultaneously by two hydraulic machines 6, 44.

Swivel angle alpha of the two hydraulic machines 6, 44 is adjusted as a function of a single output signal from control unit 46, via which actuators are synchronously controlled in order to adjust the swivel angle of the two hydraulic machines 6, 44. This control signal is applied via a signal line 48 to the two actuators in order to electrohydraulically adjust the swivel angle. Actuators of this type are marketed by the applicant as product series HS4, and so reference is made to the information presented at www.boschrexroth.de regarding the functionality.

The basic design of the converter in the region of floating body 2, piston pump 4 (double rod cylinder), and electrical machine 10 is substantially identical to the corresponding components of the converters described initially with reference to FIGS. 1 and 4, and so reference is made to these descriptions, to avoid duplication.

In the case of the converter depicted in FIG. 5, a supply/flush unit 48 is provided in order to replace the pressure medium, to prevent cavitations from occurring, and to compensate for losses due to leakage. Furthermore, the operational reliability of the converter is improved via the use of pressure protection 50.

Figure 6:
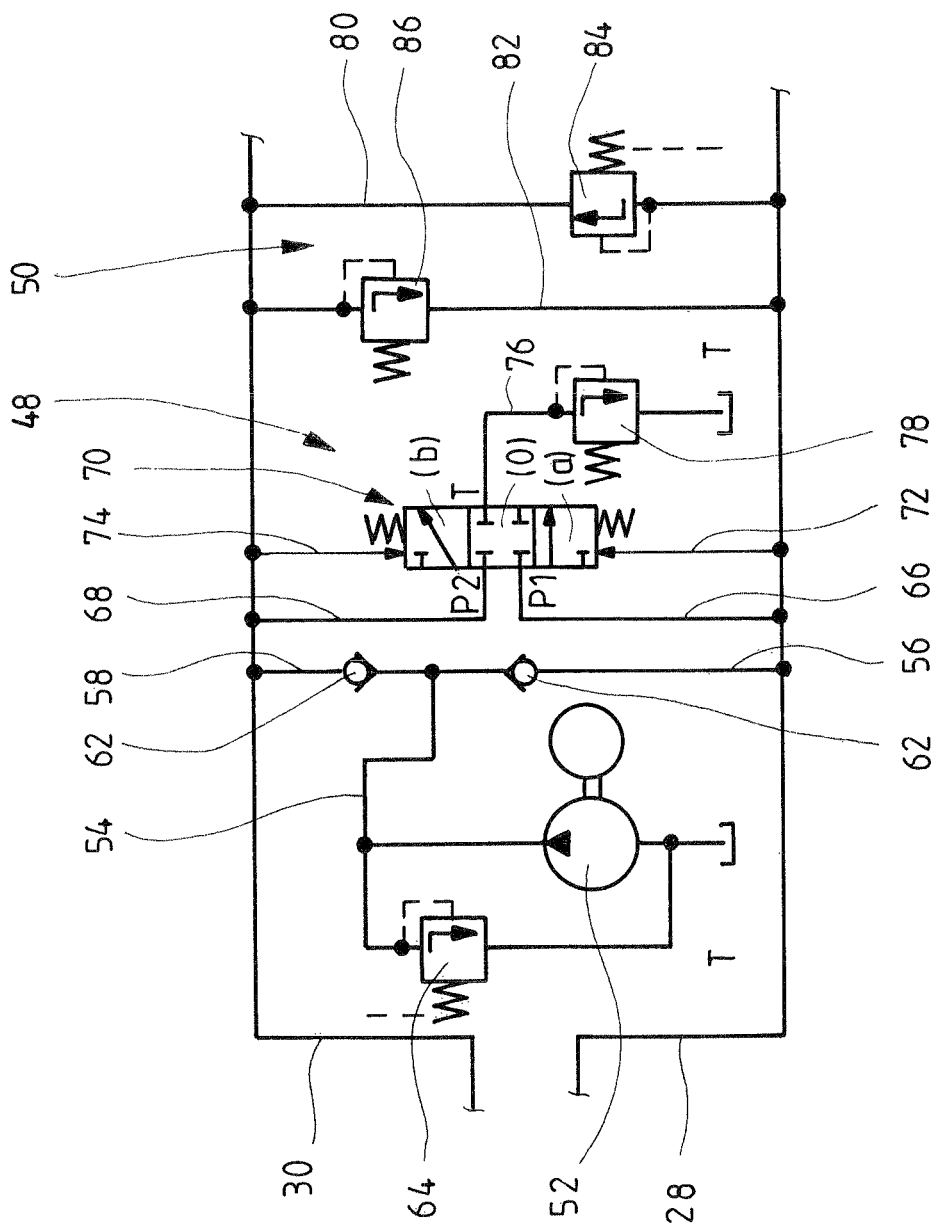
FIG. 6 shows a supply/flush unit and a pressure safeguard of the converter depicted in FIG. 5.

The specific design of supply/flush unit 48 and pressure protection 50 is explained with reference to FIG. 6. FIG. 6 shows an enlarged view of units 48, 60. During operation of converter 1, the oscillating motion of floating body 2 causes the high-pressure side and the low-pressure side in pressure lines 28, 30 to change continually and at a relatively high frequency. Under unfavorable conditions, it may happen that cavitations form on the low-pressure side. These cavitations may be prevented by supply/flush unit 48. The basic design of a supply/flush unit 48 of this type has already been described in DE 10 2005 051 324 A1 or in subsequently published document DE 10 2007 018 600, and so only those components will be described here that are required to facilitate understanding.

Supply/flush unit 48 includes a supply pump 52 designed as a constant pump, the pressure port of which is connected via a branching pressure line 54 to pressure lines 28, 30. A non-return valve 60 and 62, respectively, which are open in the direction toward particular pressure line 28 or 30, is installed in branches 56, 58 which are connected to pressure lines 28 and 30. If pressure drops in one of the pressure lines 28, 30, pressure medium may be pumped via supply pump 52 from a tank T into the particular low-pressure side. Supply pump 52 rotates at a constant speed, and the maximum pressure is limited by a supply pressure relief valve 64, and so constant pump 52 pumps in circulation if the pressure set at supply pressure relief valve 63 is exceeded.

Two flush lines 66, 68 extend away from pressure lines 28, 30, parallel to branches 56, 58, and extend toward inlet ports P1, P2 of a flush valve 70. In the embodiment shown, flush valve 70 is designed as a 3-way switching valve which, in its spring-loaded home position (0), blocks the connection from inlet ports P1, P2 to a tank connection T. Flush valve 70 is actuated via a flush control line 72 or 74 connected to pressure line 28 or 30, respectively. The control pressure acting in flush control line 72 acts on flush valve 70 in the direction of a switching position (a), in which inlet port P2 is connected to tank connection T, and further inlet connection P1 is blocked. The pressure in flush control line 74 acts accordingly on a valve spool of flush valve 70 in the direction of a switching position (b), in which pressure port P2 is then blocked and pressure connection P1 is connected to tank port T. Tank port T is connected via a tank line 76 and a pressure relief valve 78 located therein to tank T. Pressure relief valve 78 is adjusted such that, if a certain pressure in tank line 76 is exceeded when flush valve 70 is switched over (switching positions (a), (b)), a small volume of pressure medium may flow to tank T, and it is replenished immediately via supply pump 52, thereby ensuring that no pressure medium losses occur. As a result, the pressure medium in the pressure medium circuit is replaced continually, thereby making it possible to prevent the pressure medium from warming and therefore preventing a reduction in the efficiency of the converter.

Pressure protection 50 protects pressure lines 28, 30. According to the depiction shown in FIG. 6, pressure protection 50 includes two relief lines 80, 82 which are connected in parallel and connect pressure lines 28, 30, and in each of which a pressure protection valve 84, 86 designed as a pressure relief valve is located; pressure protection valve 86 limits the pressure in pressure line 30, and pressure protection valve 84 limits the pressure in pressure line 28 and controls a pressure medium connection to the other pressure line if this maximum pressure is exceeded.

Of course, supply/flush unit 48 and/or pressure protection 50 may also be used in the above-described embodiments according to FIGS. 1 and 4.

As in the case of the above-described embodiment, the two hydraulic machines 6, 44 are controlled in a force-controlled manner, and so a force which acts on double rod cylinder 4 and is dependent on the water swell and, therefore, displacement x, velocity xp, and acceleration xpp of piston 22 of double rod cylinder 4, thereby making it possible to input a relatively large amount of electrical energy into the network via generator 10.

A hydraulic machine system which includes two small hydraulic machines 6, 44 that are controlled synchronously via control unit 46 is used in the embodiment depicted in FIGS. 5 and 6. The embodiment depicted in FIG. 7 differs from the embodiment shown in FIGS. 5 and 6 only in that the two hydraulic machines 6, 44 are controlled separately. The rest of the design including floating body 2, double rod cylinder 4, pressure lines 28, 30, supply/flush unit 48, and pressure protection 50, and the design of generator 10 corresponds to the above-described embodiments, and so only the differences of converter 1 according to FIG. 7 compared to the above-described converters will be described below.

Hydraulic machines 6, 44 are identical to the above-described hydraulic machines, except for one control-related difference. As described initially, control unit 46 generates an output signal that corresponds to the swivel angle to be set, as a function of the pressures in the pressure chambers of double rod cylinder 4, displacement x of floating body 2 or piston 22, of its velocity or acceleration, and the output signal is supplied to via a signal line 47 or 48 to particular actuator (HS4) assigned to hydraulic machines 6, 44. That is, a swivel angle signal alpha 1, alpha 2 assigned to one hydraulic machine 6, 44 each is generated via control unit 46. According to a control strategy, second hydraulic machine 44 is initially moved through the neutral position, and double rod cylinder 4 is acted on only via force-controlled hydraulic machine 6 using a predetermined force that is dependent on the wave characteristics. As soon as hydraulic machine 6 has been swiveled fully outwardly, and the pressure medium flow generated via the motion of double rod cylinder 4, and the force to be controlled rise once more, second hydraulic machine 44 is also controlled. Basically, however, it is not necessary to control both hydraulic machines 6, 44 using a cascade control of this type; instead, one or both hydraulic machines 6, 44 may also be controlled separately or synchronously as a function of other operating parameters.

Figure 7:
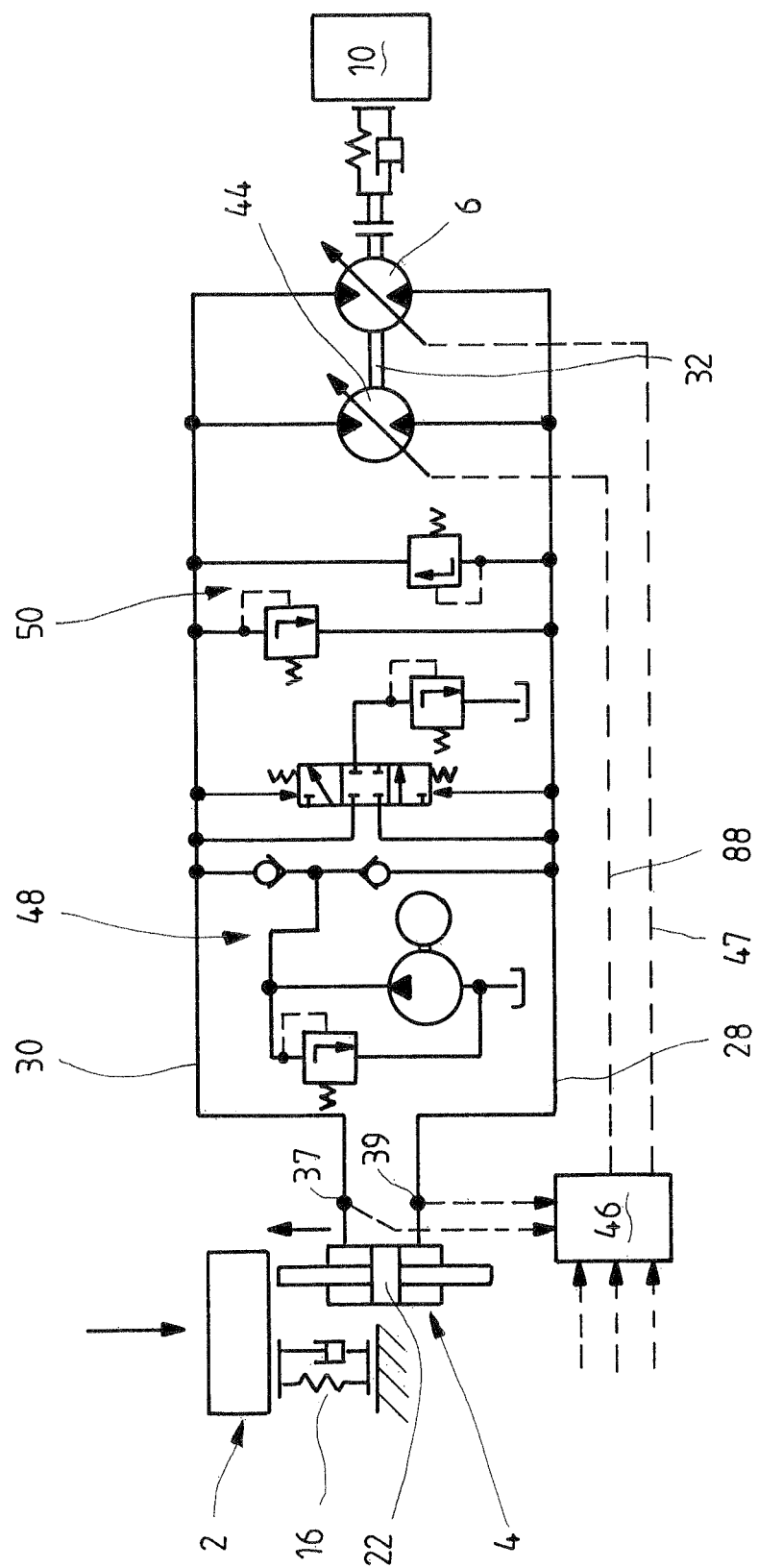
FIG. 7 shows a variant of the converter depicted in FIG. 5, in which the two hydraulic machines are controlled separately.
Figure 8:
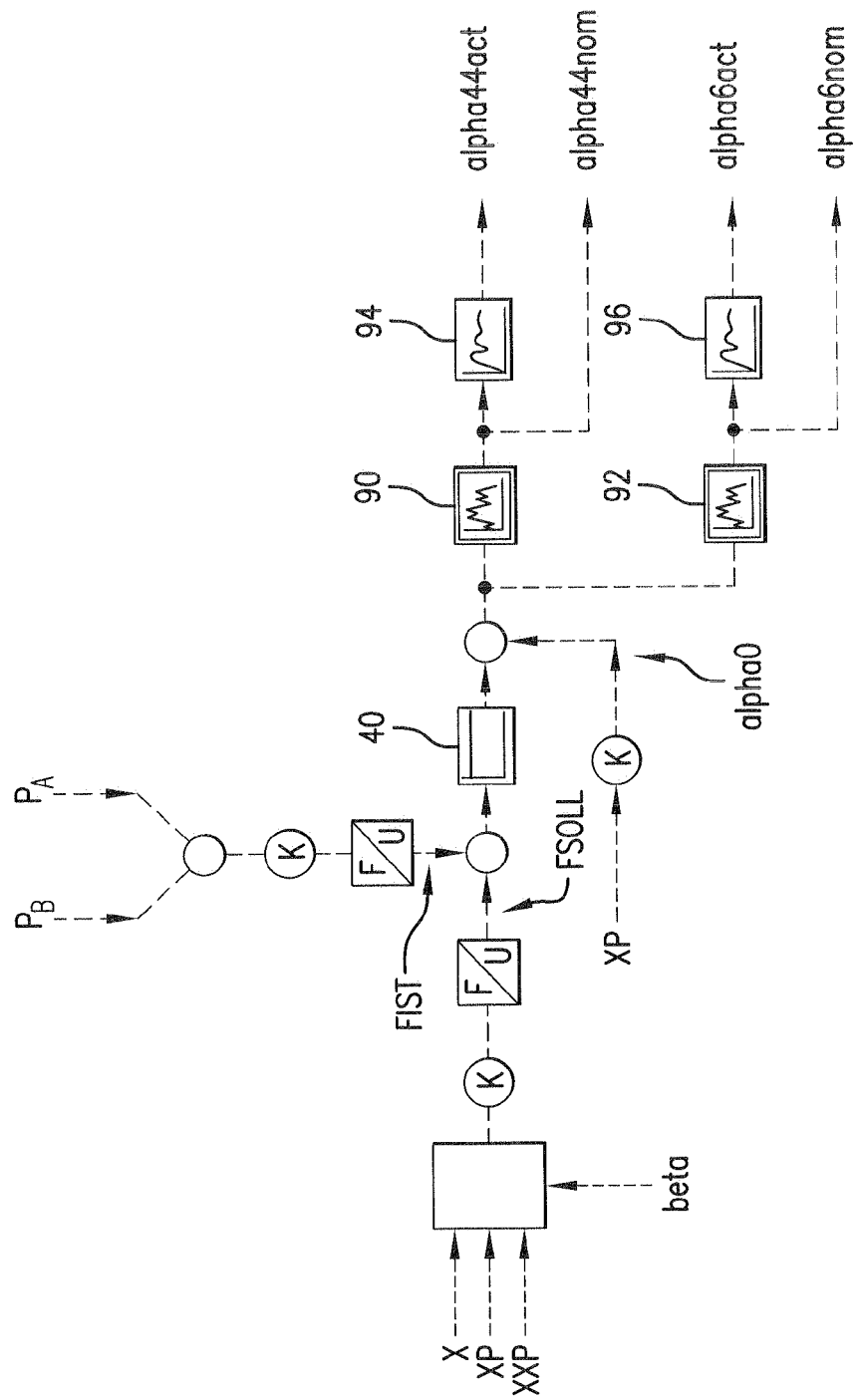
FIG. 8 shows a control circuit of a regulating unit of the converter depicted in FIG. 7.

FIG. 8 shows the control loop of the converter depicted in FIG. 7, in which this control is designed as a closed control loop.

According to FIG. 8, a setpoint force FSOLL that acts on double rod cylinder 4, and a related voltage signal are generated as a function of motion parameters x, xp, xpp, and characteristic value beta which reflects the wave climate. Pressures pA and pB are determined via pressure sensors 37, 39, and the resultant pressure differential and effective piston area A are used to calculate effective hydraulic force FIST. The difference between setpoint force FSOLL and actual force FIST is then supplied to force controller 40 which is designed, e.g., as a proportional action controller. An output signal is then output by force controller 40 depending on the comparison of actual force FIST and setpoint force FSOLL. In contrast to the solutions described above, according to the control strategy depicted in FIG. 8, this output signal is not converted directly into a swivel angle for adjusting the assigned hydraulic machine. Instead, a type of feedforward control takes place, in which velocity xp of piston 22 and the piston area are used to calculate the volume of pressure medium displaced in double rod cylinder 4, and a swivel angle alphaO that theoretically must be set on the assigned hydraulic machine in order to adjust it to an appropriate intake capacity is then calculated directly. This value, alpha0, specifies the default setting for the swivel angle that is dependent on velocity xp, and this default setting is then corrected by the value generated via force controller 40 in order to load double rod cylinder 4. That is, swivel angle alpha0 is then reduced in accordance with the output signal of force controller 40 in order to adjust force FSOLL. It has been shown that this feedforward control, which is also referred to as pilot control, results in a very stable control system since only a small swivel angle difference that corresponds to the force to be controlled need be specified via force controller 40. The signal generated via the feedforward control is then adjusted individually for each hydraulic machine 6, 44 via non-linear adaptation 90, 92. The control signal, which is different for each hydraulic machine 6, 44 after adaptation is carried out, is then applied to HS4 swivel angle actuator 94, 96 of hydraulic machine 6 or hydraulic machine 44, and it adjusted in accordance with swivel angle alpha6act for hydraulic machine 6 and swivel angle alpha44act of hydraulic machine 44. To optimize control, setpoint signal alpha6nom or alpha44nom output at particular actuator 94, 96 may be detected and compared to the actual swivel angle that was set, and the swivel angle may be adjusted, if necessary.

It has been shown that a very stable hydraulic system results when force control based on the above-described control strategy is implemented, and trials have shown that the efficiency of the converter is higher than is the case in variants depicted in FIGS. 1 and 4. The deviations between the swivel angle setpoint values (alpha6/44nom) and the swivel angle actual values (alpha6/44act) are minimal, and the efficiency is optimal in a system operated in a cascade connection.

Figure 9:
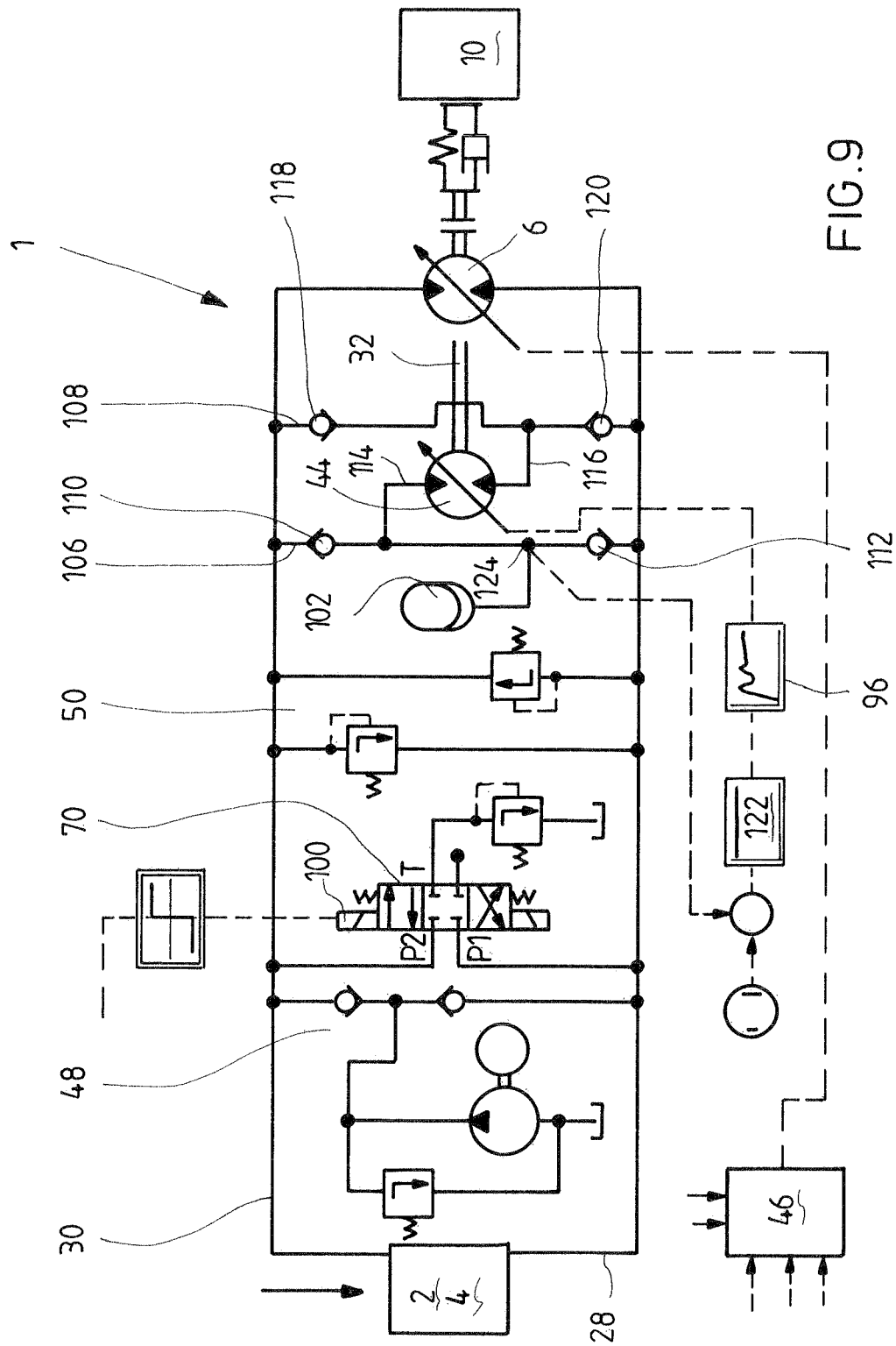
FIG. 9 shows a further development of a converter which includes two relatively small hydraulic machines.

FIG. 9 shows an embodiment of a converter 1, the basic design of which corresponds to that shown in FIG. 7. In the illustration shown in FIG. 9, the individual depiction of floating body 2 and double rod cylinder 4 was eliminated, and these components are merely indicated.

As in the embodiment described above, pressure lines 28, 30 are connected to the ports of two relatively small hydraulic machines 6, 44, and it is not necessary for the latter to be movable through the neutral position. Hydraulic machines 6, 44 act on the same connection train 32 to drive electrical machine 10 or to be driven by the same.

The hydraulic circuit is designed to include a supply/flush unit 48 and a pressure protection 50, the basic design of which corresponds to that depicted in FIG. 6. There is only one difference in the design of flush valves 70. In the embodiment shown in FIG. 9, flush valve 70 is not adjusted via the pressure in pressure lines 28, 30, but via electromagnets 98, 100. They are controlled via control unit 46 as a function of velocity xp of piston 22 of double rod cylinder 4.

Flush valve 70 is preloaded via a spring system in its blocking position (0), in which ports P1, P2 and T are blocked relative to one another. When electromagnet 100 located at the top in FIG. 9 is energized, flush valve 70 is moved to its switching position (a), in which inlet port P2 is connected to tank port T. Inlet port P1 is then blocked. When the other electromagnet, electromagnet 98, is energized, flush valve 70 is moved to its switching position (b), in which inlet port P1 is connected to tank port T, and the other inlet port, inlet port P2, is blocked. The replacement of pressure medium is therefore controlled via the energizing of electromagnets 98, 100, although there is basically no difference from the embodiment depicted in FIG. 8, and so no further explanations are necessary. Instead of electromagnets 98, 100, other actuators may be used.

While, in the case of the embodiment depicted in FIG. 7, a control unit 46 is assigned to both hydraulic machines 6, 44, in the embodiment depicted in FIG. 9, however, the swivel angle of hydraulic machine 6 is adjusted via a control unit 46 designed as a force controller as a function of parameters x, xp, xpp, pB and pA, in order to load or apply a predetermined force to double rod cylinder 4. The adjustment of swivel angle alpha6 of hydraulic machine 6 after force control is carried out is basically the same as that for the above-described embodiments. Second hydraulic machine 44 is torque-controlled. Accordingly, the swivel angle of hydraulic machine 44 is adjusted such that a level of torque that remains approximately the same always results in connection train 32 to generator 10.

A hydraulic accumulator 102 is assigned to second hydraulic machine 44 on the high-pressure side. Since the high-pressure side and the low-pressure change change constantly in a converter 1 of this type, a hydraulic rectifier 104 must also be assigned to hydraulic machine 44. Hydraulic rectifiers of this type are known and may be designed, e.g., as a directional control valve, or as a non-return valve system, as in the embodiment shown. In the embodiment depicted in FIG. 9, pressure lines 28, 30 are interconnected via a high-pressure line 105 on the high-pressure side, and via a low-pressure line 108 on the low-pressure side. Two high-pressure non-return valves 110, 112, which block in the direction toward pressure line 30 and/or in the direction toward pressure line 28, are located in high-pressure line 106, between which a supply line 114 branches off toward the supply port of hydraulic machine 44. Its drain port is connected via a drain line 116 to a line section of low-pressure line 108 located between two low-pressure non-return valves 118, 120, each of which opens toward adjacent pressure lines 28, 30. Via this hydraulic rectifier formed by non-return valve system 110, 112, 118, 120, it is ensured that the higher of the pressures in pressure lines 28, 30 is always present in supply line 114. Hydraulic accumulator 102 is connected to the line section between the two high-pressure non-return valves 110, 112. Due to this rectifier, it is not necessary to design hydraulic machine 44 to be movable through the neutral position. Instead of the non-return valve system, a directional control valve may also be used, e.g., of the type described in subsequently published application DE 10 2007 018 600.

Swivel angle alpha44 of hydraulic machine 44 is adjusted via a separate controller which is depicted schematically in FIG. 9. Hydraulic machine 44 is basically controlled in a torque control, in which case swivel angle alpha44 is adjusted such that a torque that remains approximately constant acts on connection train 32. The control loop for the torque control is not depicted in FIG. 9, and it may be designed as described in the embodiments mentioned above.

Pressure control is superposed on the torque control of hydraulic machine 44. To this end, control unit 122 depicted in FIG. 9 adjusts swivel angle alpha44 such that a predetermined pressure is attained at the inlet to hydraulic machine 44 and, therefore, in hydraulic accumulator 102. This pressure is detected via a pressure sensor 124 and is compared to a specified system pressure pSYS that is dependent on the wave climate. The difference is supplied to control unit 122, and its output signal is applied to actuator 96 to adjust swivel angle alpha44 of hydraulic machine 44.

The control strategy realized in the embodiment depicted in FIG. 9 will be explained with reference to a wave cycle. It is assumed that floating body 2 is located in the region of a wave trough. Therefore, the pressure medium flow rates and the force required by double rod cylinder 4 are relatively small, and so hydraulic machine 6 may carry out force control on its own. At the same time, second hydraulic machine 44 drains previously loaded hydraulic accumulator 102 and applies a defined torque to connection train 32 in accordance with the torque control.

When floating body 2 moves out of the wave trough, floating body 2 and piston 22 of double rod cylinder 4 are accelerated relatively greatly, and so effective force FW and the pressure medium flow through hydraulic machine 6 increase. In the instant in which the intake volume of hydraulic machine 6 is smaller than the pressure medium flow delivered by double rod cylinder 4, even when hydraulic machine 6 is swiveled fully outwardly, the pressure in the system increases such that a portion of this pressure medium flows through high-pressure non-return valve 110 or 112 on the high-pressure side into hydraulic accumulator 102 and loads it. The rate at which hydraulic accumulator 102 is loaded depends on swivel angle alpha44 of second hydraulic machine 44, i.e., the system pressure may be adjusted in a relatively timely manner by adjusting swivel angle alpha44.

As the floating body continues to move in the direction of the wave crest, the above-described pressure medium flows and the preload force acting on the double rod cylinder decrease, and so, in turn, force control may be performed via hydraulic machine 6, while second hydraulic machine 44 drains hydraulic accumulator 102, which is now loaded, and applies a predetermined torque to the connection train. The wave cycle may now start from the beginning again.

The individual control strategies described above may basically be used in all of the converters described above. In converters that include a plurality of small hydraulic machines, they may be activated synchronously or independently of one another as a function of nearly any system parameters.

The present invention relates to a converter comprising a pump which is driven directly or indirectly by a natural force such as a water swell, it being possible for a hydraulic machine to be driven by the pump. The hydraulic machine is force-coupled to an electrical machine which may function as a generator or a motor. According to the present invention, the force acting on the pump is regulated via a control loop as a function of an oscillation parameter of the natural force.

| Reference numerals: | |
| --- | --- |
| 1 | Converter |
| 2 | Floating body |
| 4 | Double rod cylinder |
| 6 | Hydraulic machine |
| 8 | Control loop |
| 10 | Electrical machine |
| 12 | Power supply |
| 14 | Oscillating weight |
| 16 | Spring/damping system |
| 18 | Ocean floor |
| 20 | Piston rod |
| 22 | Piston |
| 24 | Annular chamber |
| 26 | Annular chamber |
| 28 | Pressure line |
| 30 | Pressure line |
| 32 | Connection train |
| 34 | Coupling |
| 36 | Hydraulic accumulator |
| 37 | Pressure sensor |
| 38 | Hydraulic accumulator |
| 39 | Pressure sensor |
| 40 | Force controller |
| 42 | Centrifugal mass |
| 44 | Hydraulic machine |
| 46 | Automatic control unit |
| 47 | Signal line |
| 48 | Supply/rinse unit |
| 50 | Pressure protection |
| 52 | Supply pump |
| 54 | Supply line |
| 56 | Branch |
| 58 | Branch |
| 60 | Non-return valve |
| 62 | Non-return valve |
| 64 | Supply pressure relief valve |
| 66 | Flush line |
| 68 | Flush line |
| 70 | Flush valve |
| 72 | Rinse control line |
| 74 | Rinse control line |
| 76 | Tank line |
| 78 | Pressure-limiting valve |
| 80 | Relief line |
| 82 | Relief line |

| -continued | |
| --- | --- |
| Reference numerals: | |
| 84 | Pressure protection valve |
| 86 | Pressure protection valve |
| 88 | Signal line |
| 90 | Non-linear adaptation |
| 92 | Non-linear adaptation |
| 94 | Actuator |
| 96 | Actuator |
| 98 | Electromagnet |
| 100 | Electromagnet |
| 102 | Hydraulic accumulator |
| 104 | Rectifier |
| 106 | High pressure line |
| 108 | Low pressure line |
| 110 | High pressure non-return valve |
| 112 | High pressure non-return valve |
| 114 | Supply line |
| 116 | Drain line |
| 118 | Low pressure non-return valve |
| 120 | Low pressure non-return valve |
| 122 | Automatic control unit |
| 124 | Pressure sensor |

What is claimed is:

1. A hydraulic/electrical converter comprising
a pump (4) which is driven by a natural force and is used to drive a hydraulic machine system (6) which is coupled to an electrical machine (10) in order to convert mechanical energy into electrical energy,
wherein a hydraulic machine (6) of the hydraulic machine system is adjustable, and
wherein a control loop (8) adjusts the hydraulic machine (6) by acting upon the pump (4) using a predetermined force (F) or a predetermined pressure, and
wherein the hydraulic machine system includes a second, torque controlled hydraulic machine (44) for driving the electrical machine (10).

2. The converter as recited in claim 1, in which the pump is a piston pump comprising a double rod cylinder (4), the pressure chambers (24, 26) of which are each connected via a pressure line (28, 30) to ports of the hydraulic machine (6).

3. The converter as recited in claim 2, in which a hydraulic accumulator (36, 38) is provided in at least one of the pressure lines (28, 30).

4. The converter as recited in claim 2, comprising pressure sensors (37, 39) for determining the pressure in the annular chambers (24, 26) of the piston pump (4).

5. The converter as recited in claim 1, in which the two hydraulic machines (6, 44) is controlled separately.

6. The converter as recited in claim 5, in which the second hydraulic machine (44) is controllable to a maximum intake capacity only after pressure medium flow to the first hydraulic machine (6) has ceased.

7. The converter as recited in claim 1, in which the two hydraulic machines (6, 44) is controlled synchronously.

8. The converter as recited claim 1, in which a pressure accumulator (102) and a hydraulic rectifier (104) are assigned to the second hydraulic machine (44) on the high-pressure side.

9. The converter as recited in claim 1, comprising a high-pressure protection (50) between the two pressure lines (28, 30).

10. The converter as recited in claim 1, in which a coupling (34) is installed in a connection train (32) between the hydraulic machine (6, 44) and the electrical machine (10).

11. The converter as recited in claim 10, in which a centrifugal mass (42) is provided in the connection train (32).

12. The converter as recited in claim 1, in which at least one hydraulic machine (6, 44) may be operated in four quadrant mode, or it may be moved through the neutral position.

13. The converter as recited in claim 1, in which the electrical machine (10) revolves at an approximately constant speed.

14. The converter as recited in claim 1, in which the natural force is a water swell that acts on a floating body (2), via which the pump (4) may be driven.

15. The converter as recited in claim 1, in which the force (F) is adjusted such that a natural weight of the floating body (2) that acts in the lowering direction may be compensated for.

16. The converter as recited in claim 1, in which the electrical machine (10) is an asynchronous machine.

17. A hydraulic/electrical converter comprising
a pump 4 which is driven by a natural force and may be used to drive a hydraulic machine system (6) which is coupled to an electrical machine 10 in order to convert mechanical energy into electrical energy, wherein a hydraulic machine (6) of the hydraulic machine system is adjustable and wherein the pump (4) includes pressure chambers (24, 26) that are connected via respective pressure lines (28, 30) to ports of the hydraulic machine (6), and
a supply/flush unit (48) for connecting the pressure lines (28, 30) to a tank (T) or a supply pump (52);
wherein a control loop (8) is assigned to the pump (4), via which the hydraulic machine (6) is adjusted such that the pump (4) is acted upon using a predetermined force (F) or a predetermined pressure.

18. A method for converting mechanical energy into electrical energy using a converter (1) which includes a pump (4) driven by a natural force, and via which a hydraulic machine (6, 44) which may be moved through the neutral position, the hydraulic machine (6, 44) being coupled to an electrical machine (10), and to a force/pressure control of the pump, comprising the steps: adjusting a force (F) that acts on a piston (22) of the pump (4) by adjusting the hydraulic machine (6, 44) as a function of a parameter of the natural force, and wherein the force is adjusted such that the piston (22) is braked in the region of the piston's dead centers.

19. The method as recited in claim 18, in which the pump (4) comprises pressure chambers (24, 26) and in which a closed-loop control is carried out as a function of the piston speed, the displacement, the pressure in the pressure chambers (24, 26) of the piston pump (4), and/or an amplitude and frequency of the natural force.

20. The method as recited in claim 18, in which the force is adjusted by adjusting a swivel angle (alpha) of the hydraulic machine (6, 44).

21. The method as recited in claim 18, in which the electrical machine (10) is driven by a further hydraulic machine (44), and the two hydraulic machines (6, 44) are controlled synchronously.

22. The method as recited in claim 18, in which the electrical machine (10) is driven by a further hydraulic machine (44), and the two hydraulic machines (6, 44) are controlled separately.

23. The method as recited in claim 22, in which a hydraulic machine (44) is force controlled, and the further hydraulic machine (44) is torque controlled.

24. The method as recited in claim 23, in which a hydraulic accumulator (102) and a rectifier are assigned to the further hydraulic machine (44), and, when the hydraulic machine (6) is adjusted to maximum displacement, a system pressure, which also acts in the hydraulic accumulator (102), is adjusted via the swivel angle of the further hydraulic machine (44).

25. The method as recited in claim 22, in which, given a low pressure medium flow, only one hydraulic machine (6) is adjusted initially, and only after a pressure medium flow approximately adjusts the only one hydraulic machine to maximum intake/displacement, is the second hydraulic machine (44) activated.

26. The method as recited in claim 18, further comprising generating a control signals for activating the hydraulic machine (6, 44) based on an output signal of a control loop (46, 122) and a set value for activating the hydraulic machine (6, 44).

27. The method as recited in claim 26, in which the control signal resulting from the output signal and the pilot value is converted via non-linear adaptation into a control signal for adjusting a hydraulic machine (6, 44).

\* \* \* \* \*